(12) United States Patent
Maseki et al.

(10) Patent No.: US 10,274,938 B2
(45) Date of Patent: Apr. 30, 2019

(54) NUMERICAL CONTROL UNIT AND NC PROGRAM CREATING UNIT

(71) Applicant: JTEKT CORPORATION, Osaka-shi (JP)

(72) Inventors: Katsuhiro Maseki, Nagoya (JP); Tatsuhiko Inagaki, Ichinomiya (JP); Hiroyuki Tsusaka, Nagoya (JP); Kazuhiro Tsujimura, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 751 days.

(21) Appl. No.: 14/641,946

(22) Filed: Mar. 9, 2015

(65) Prior Publication Data

US 2015/0261214 A1    Sep. 17, 2015

(30) Foreign Application Priority Data

Mar. 12, 2014    (JP) .................................. 2014-048536

(51) Int. Cl.
G05B 19/416    (2006.01)

(52) U.S. Cl.
CPC ..... *G05B 19/4163* (2013.01); *G05B 2219/36293* (2013.01); *G05B 2219/43124* (2013.01); *G05B 2219/50232* (2013.01)

(58) Field of Classification Search
CPC ...... G05B 19/4163; G05B 2219/50232; G05B 2219/43124; G05B 2219/36293
USPC ....................................................... 700/174
See application file for complete search history.

(56) References Cited

U.S. PATENT DOCUMENTS

| | | | |
|---|---|---|---|
| 3,720,120 A | 3/1973 | Cutler | |
| 3,873,816 A | 3/1975 | Takeyama et al. | |
| 4,078,195 A | 3/1978 | Mathias et al. | |
| 4,509,126 A * | 4/1985 | Olig .............. | G05B 19/4163 318/561 |
| 4,698,773 A | 10/1987 | Jeppsson | |
| 4,992,948 A | 2/1991 | Pilland et al. | |
| 5,083,280 A | 1/1992 | Yamamoto et al. | |

(Continued)

FOREIGN PATENT DOCUMENTS

| | | |
|---|---|---|
| CN | 101206471 A | 6/2008 |
| EP | 1 132 789 A2 | 9/2001 |

(Continued)

OTHER PUBLICATIONS

Extended European Search Report dated Dec. 22, 2015 in Patent Application No. 15158350.7.

(Continued)

*Primary Examiner* — Ziaul Karim
(74) *Attorney, Agent, or Firm* — Oblon, McClelland, Maier & Neustadt, L.L.P.

(57) ABSTRACT

A numerical control unit is provided that can change an override value according to various workpiece materials and can extend the tool life. A numerical control unit includes a variation storage unit that stores a variation in override value of a feed speed or a spindle speed for each workpiece material, an override value setting unit that sets the override value based on the variation in override value according to the material of a workpiece being machined; and a control unit that changes the feed speed or the spindle speed based on the override value.

4 Claims, 11 Drawing Sheets

(56) References Cited

U.S. PATENT DOCUMENTS

| | | | | |
|---|---|---|---|---|
| 6,113,461 | A * | 9/2000 | Onoda | B24B 49/10 451/5 |
| 6,662,073 | B1 | 12/2003 | Fujishima et al. | |
| 2001/0027354 | A1 * | 10/2001 | Kakino | G05B 19/4163 700/173 |
| 2003/0075818 | A1 | 4/2003 | Morwald et al. | |
| 2004/0167659 | A1 | 8/2004 | Scherer | |
| 2009/0228135 | A1 * | 9/2009 | Nakamura | G05B 19/409 700/173 |
| 2010/0104388 | A1 * | 4/2010 | Suzuki | B23Q 11/0039 409/131 |
| 2010/0191365 | A1 * | 7/2010 | Yonezu | B23Q 17/22 700/174 |
| 2013/0189043 | A1 | 7/2013 | Uchiuzo et al. | |

FOREIGN PATENT DOCUMENTS

| | | |
|---|---|---|
| EP | 1 296 210 A1 | 3/2003 |
| EP | 2 591 870 A1 | 5/2013 |
| GB | 2 121 565 A | 12/1983 |
| JP | 56-129912 | 10/1981 |
| JP | 11-65633 A | 3/1999 |
| JP | 11-194808 A | 7/1999 |
| JP | 2000-135652 A | 5/2000 |
| JP | 2008-112217 | 5/2008 |
| WO | WO 2008/012884 A1 | 1/2008 |

OTHER PUBLICATIONS

Partial European Search Report dated Aug. 5, 2015 in Patent Application No. 15158350.7.

Japanese Office Action dated Jan. 9, 2018 in Patent Application No. 2014-048536 (with English translation), citing documents AO-AR therein, 6 pages.

Office Action issued in corresponding Chinese Patent Application No. 201510104389.9 dated Jul. 2, 2018, citing reference AO therein (with English Translation).

* cited by examiner

NUMERICAL CONTROL UNIT AND NC PROGRAM CREATING UNIT

INCORPORATION BY REFERENCE

The disclosure of Japanese Patent Application No. 2014-048536 filed on Mar. 12, 2014 including the specification, drawings and abstract, is incorporated herein by reference in its entirety.

BACKGROUND OF THE INVENTION

1. Field of the Invention

The invention relates to numerical control units and numerical control (NC) program creating units.

2. Description of the Related Art

As shown in Japanese Patent Application Publication Nos. S56-129912 (JP S56-129912 A) and 2008-112217 (JP 2008-112217 A), it is known to change the feed speed or the spindle speed by changing an override value of the feed speed or the spindle speed during machining in order to improve machining efficiency.

In recent years, it has been increasingly required to cut workpieces of materials with high hardness such as titanium. However, in the case of cutting high hardness materials, a tool is sometimes broken in a short time if an override value is changed as cutting steel materials. Moreover, in an NC program, a code for performing an override function is manually inserted by an operator, and is not automatically inserted.

SUMMARY OF THE INVENTION

It is one object of the invention to provide a numerical control unit that can change an override value for workpieces of various materials and to extend the tool life. It is another object of the invention to provide a numerical control unit and an NC program creating unit which can automatically insert a code for performing an override function.

A numerical control unit for a machine tool according to an aspect of the invention includes: a variation storage unit that stores a variation that is an amount of change to be used to change a numerical value, the variation being a variation in override value of a feed speed or a spindle speed and being set for each workpiece material; an override value setting unit that sets the override value based on the variation in override value according to the material of a workpiece being machined; and a control unit that changes the feed speed or the spindle speed based on the override value.

Since the override value is set based on the variation in override value according to the workpiece material, the tool life is extended for workpieces of various materials.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 shows an NC program that is input to the numerical control unit in FIG. 1, and that corresponds to an NC program created by an NC program creating unit according to a second embodiment and also corresponds to an NC program created by an NC program editing unit according to a third embodiment;

FIG. 10 shows an NC program that is input to the NC program creating unit in FIG. 7;

DETAILED DESCRIPTION OF EMBODIMENTS

Figure 1:
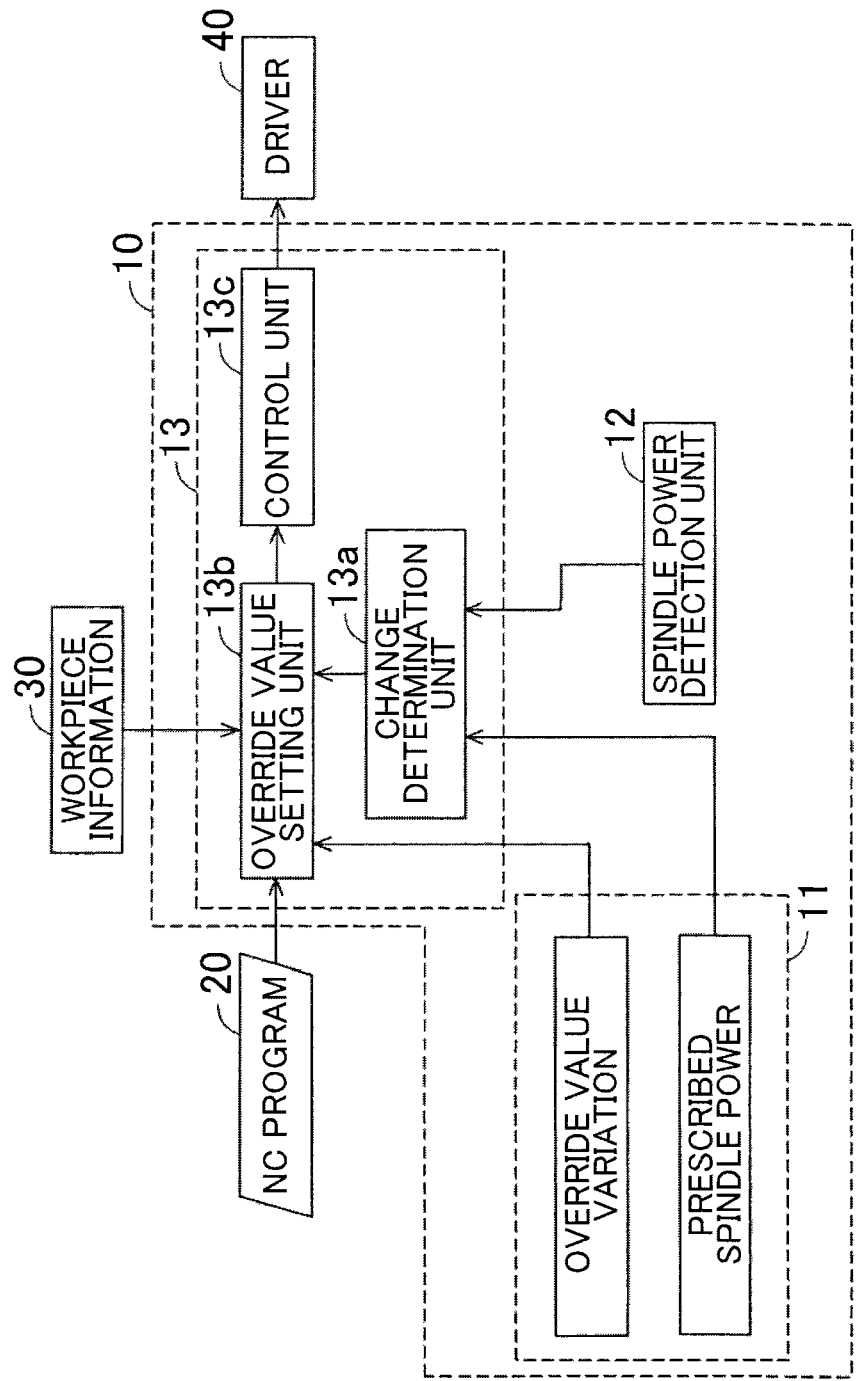
FIG. 1 is a block diagram of a numerical control unit according to a first embodiment.

A numerical control unit 10 according to a first embodiment of the invention will be described with reference to FIGS. 1 to 6. As shown in FIG. 1, the numerical control unit 10 includes a storage unit 11, a spindle power detection unit 12, and an adaptive control unit 13. The numerical control unit of the present embodiment and the storage unit, the spindle power detection unit, and the adaptive control unit that are included in the numerical control unit are implemented by hardware comprised of a central processing unit (CPU) and a memory, an input device, a display, etc., and software of procedures for various kinds of arithmetic processing.

As shown in FIG. 1, the storage unit 11 stores prescribed spindle power Pth and a variation $\Delta Rv$ in override value (hereinafter referred to as the "override value variation $\Delta Rv$") for each tool. The prescribed spindle power Pth is a ratio of power of a spindle that can be used for machining with respect to rated power of the spindle. That is, the prescribed spindle power Pth is the percentage of the power of the spindle that can be used for machining relative to the rated power of the spindle (100%). The override value variation $\Delta Rv$ will be described in detail later.

Figure 2:
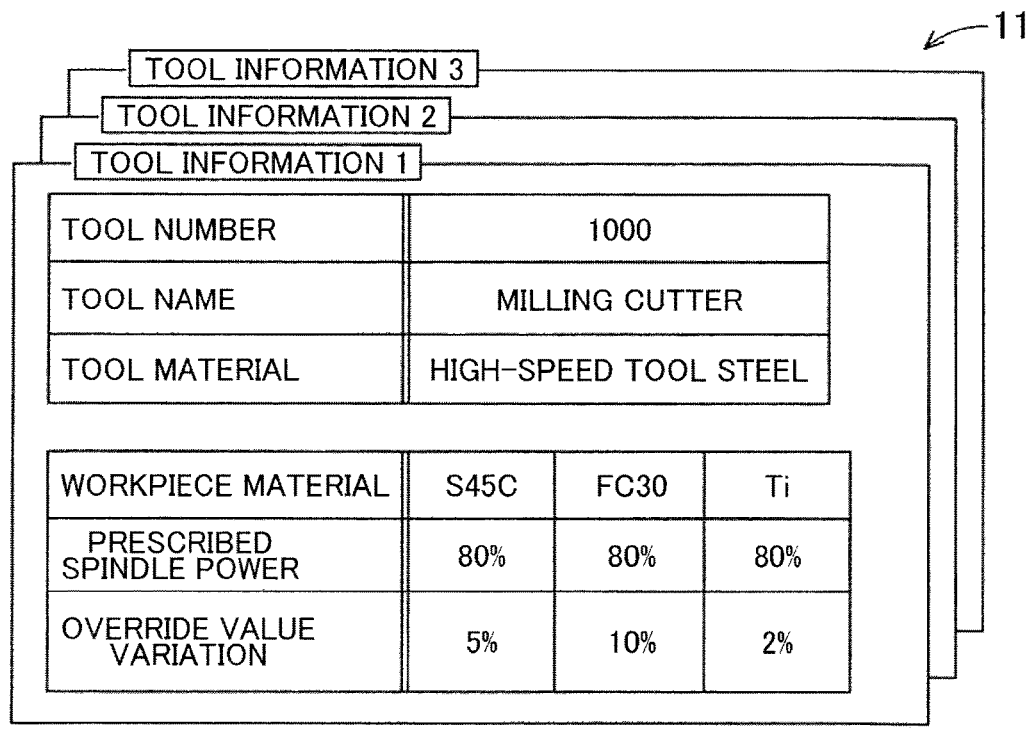
FIG. 2 shows tool information that is stored in a storage unit in FIG. 1.

FIG. 2 shows details of data that is stored in the storage unit 11. The storage unit 11 stores tool information for each of a plurality of tools included in a machine tool. The tool information on each tool includes values of the prescribed spindle power Pth and the override value variation $\Delta Rv$ according to workpiece materials, in addition to a tool number, a tool name, and a tool material.

In tool information 1, for example, the tool number is "1000," the tool name is "milling cutter," and the tool material is "high-speed tool steel." Moreover, in the case where the workpiece material is S45C, the prescribed spindle power Pth is 80%, and the override value variation $\Delta Rv$ is 5%. In the case where the workpiece material is JIS FC30 (casting iron), the prescribed spindle power Pth is 80%, and the override value variation $\Delta Rv$ is 10%. In the case where the workpiece material is a titanium alloy (Ti alloy), the prescribed spindle power Pth is 80%, and the override value variation $\Delta Rv$ is 2%. The override value variation ΔRv is thus set to a smaller value as the hardness of the material of the workpiece is higher, and is set to a larger value as the hardness of the material of the workpiece is lower.

As described above, the prescribed spindle power Pth is the ratio of the power of the spindle that can be used for machining with respect to the rated power of the spindle. Such machining conditions that spindle power P for machining is close to the prescribed spindle power Pth optimizes, i.e., maximizes, the machining efficiency. The prescribed spindle power Pth is set for each tool and each workpiece material by performing test machining. In FIG. 2, the prescribed spindle power Pth is set to the same value for the different workpiece materials. However, the invention is not limited to this, and the prescribed spindle power Pth may be set to different values for different workpiece materials.

Override values include an override value of the spindle speed in addition to an override value of the feed speed of a feed mechanism. The numerical control unit 10 of the present embodiment is an example in which the numerical control unit computes and changes the override value of the feed speed. The override value is used to change a feed speed command value described in an NC program 20. Specifically, a control unit 13c controls a driver 40 of a drive motor for the feed mechanism based on a corrected feed speed command value obtained by multiplying the feed speed command value in the NC program 20 by the override value. For example, if the feed speed command value in the NC program 20 is 1,000 m/min and the override value is 120%, the corrected feed speed command value is 1,200 m/min.

The override value variation ΔRv is the rate of change that is used to change the override value during adaptive control. The adaptive control will be described in detail later. The override value is changed at predetermined time intervals (e.g., 8-msec intervals) according to the comparison result between the spindle power P during machining and the preset prescribed spindle power Pth. For example, as shown in the tool information 1 in FIG. 2, in the case where a workpiece made of FC30 is being machined with a tool whose tool number is 1000 and it is determined that the override value should be increased, the override value is increased by 10% from the current override value of the feed speed, and the increased override value is maintained for the predetermined time. In the case where a workpiece made of a Ti alloy is being machined with the tool whose tool number is 1000 and it is determined that the override value should be increased, the override value is increased by 2% from the current override value of the feed speed, and the increased override value is maintained for the predetermined time.

The spindle power detection unit 12 detects the spindle power P that is currently being consumed by the spindle. For example, the spindle power detection unit 12 detects the spindle power P by detecting a current and voltage that are supplied to a motor that drives the spindle.

The adaptive control unit 13 obtains the NC program 20 and information 30 on a workpiece that is currently being machined, and performs adaptive control of changing the feed speed during machining by using the information that is stored in the storage unit 11 and the spindle power P that is detected by the spindle power detection unit 12. The adaptive control unit 13 includes a change determination unit 13a, an override value setting unit 13b, and the control unit 13c.

The change determination unit 13a compares the spindle power P during machining with the preset prescribed spindle power Pth at the predetermined time intervals (e.g., 8-msec intervals) to determine if the override value needs to be changed.

The override value setting unit 13b obtains the NC program 20 and the workpiece information 30. The override value setting unit 13b sets the override value based on the override value variation ΔRv if it is determined by the change determination unit 13a that the override value should be changed. The override value variation ΔRv is a value corresponding to the material of the workpiece being machined out of the values stored in the storage unit 11. The override value setting unit 13b does not change the override value from 100% if it is determined by the change determination unit 13a that the override value should not be changed.

The control unit 13c multiplies the feed speed command value in the NC program 20 by the override value set by the override value setting unit 13b, and outputs the product to the driver 40. That is, the control unit 13c controls the driver 40 while changing the feed speed so that the spindle power P becomes close to the prescribed spindle power Pth.

Figure 3:
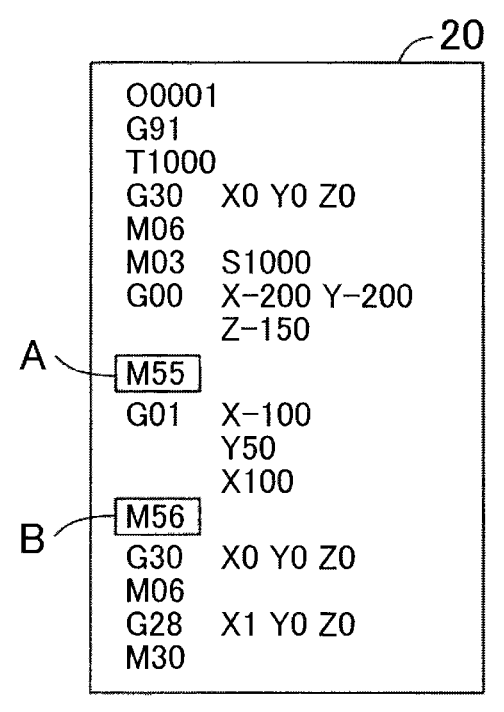

For example, the NC program 20 that is input to the numerical control unit 10 is a program shown in FIG. 3. In the NC program 20, an adaptive control start code M55 (see A in FIG. 3) is placed before a movement code G01 for cutting, and an adaptive control end code M56 (see B in FIG. 3) is placed after the movement code G01 for cutting. That is, the control unit 13c controls the driver 40 while changing the override value of the feed speed during a period from M55 to M56.

Figure 4:
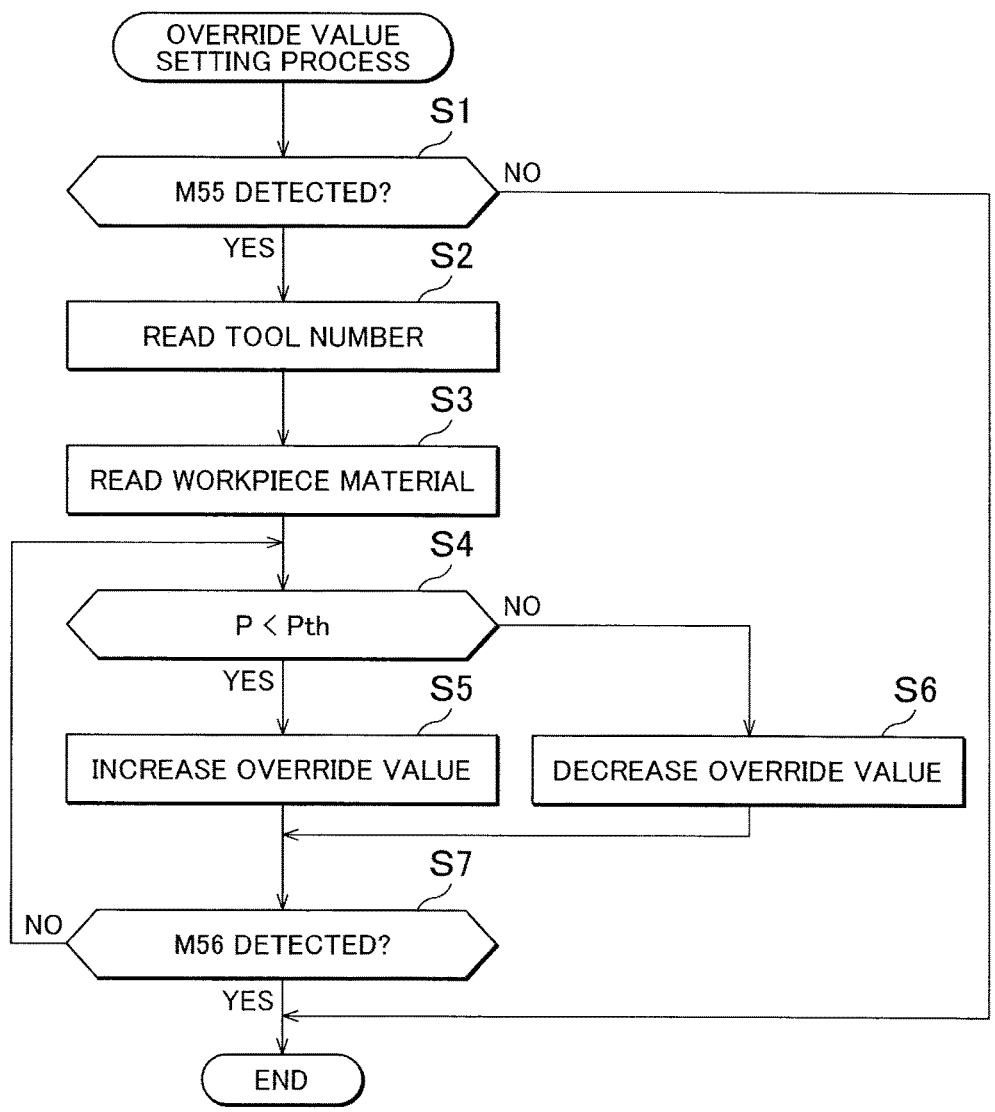
FIG. 4 is a flowchart illustrating a process that is performed by an override value setting unit in FIG. 1.

A process that is performed by the override value setting unit 13b and the change determination unit 13a will be described with reference to FIG. 4. The override value setting unit 13b analyzes the NC program 20 to determine if there is M55 (S1). The override value setting unit 13b terminates the process if it does not detect M55 in the NC program 20.

If the override value setting unit 13b detects M55, it reads a current tool number in the NC program 20 (S2). Since there is "T1000" on the third line of the NC program 20 in FIG. 3, the override value setting unit 13b reads the tool number 1000. The override value setting unit 13b then reads the workpiece material as the workpiece information 30 (S30). The operator may enter the material of the workpiece to be machined to the numerical control unit 10 when machining the workpiece, or may describe the material of the workpiece in the NC program 20.

Thereafter, the override value setting unit 13b obtains the prescribed spindle power Pth corresponding to the read tool number and workpiece material from the storage unit 11. At the same time, the override value setting unit 13b receives the determination result of whether the override value needs to be changed or not from the change determination unit 13a. The change determination unit 13a makes this determination as follows. The change determination unit 13a obtains current spindle power P from the spindle power detection unit 12 and compares the current spindle power P with the prescribed spindle power Pth to determine if the spindle power P is smaller than the prescribed spindle power Pth (S4).

If the spindle power P is smaller than the prescribed spindle power Pth (S4: Yes), the change determination unit 13a determines that the override value needs to be increased. According to this determination result, the override value setting unit 13b increases the override value by the override value variation ΔRv (S5).

If the spindle power P is equal to or larger than the prescribed spindle power Pth (S4: No), the change determination unit 13a determines that the override value needs to be decreased. According to this determination result, the override value setting unit 13b decreases the override value by the override value variation ΔRv (S6). This override value variation ΔRv is the override value variation ΔRv corresponding to the read tool number and workpiece material out of the override value variations ΔRv stored in the storage unit 11.

Subsequently, the override value setting unit 13b analyzes the NC program 20 to determine if there is M56 (S7). The override value setting unit 13b terminates the process if it detects M56. If the override value setting unit 13b does not detect M56 (S7: No), the routine returns to S4, and the process is repeated. When repeating S4 and the subsequent steps, the override value setting unit 13b changes the override value the predetermined time (e.g., 8 msec) after the last time it changed the override value.

How the spindle power P and the override value change in the case of machining a workpiece made of FC30 and a workpiece made of a Ti alloy with a milling cutter whose tool number is 1000 will be described with reference to FIGS. 5 and 6.

Figure 5:
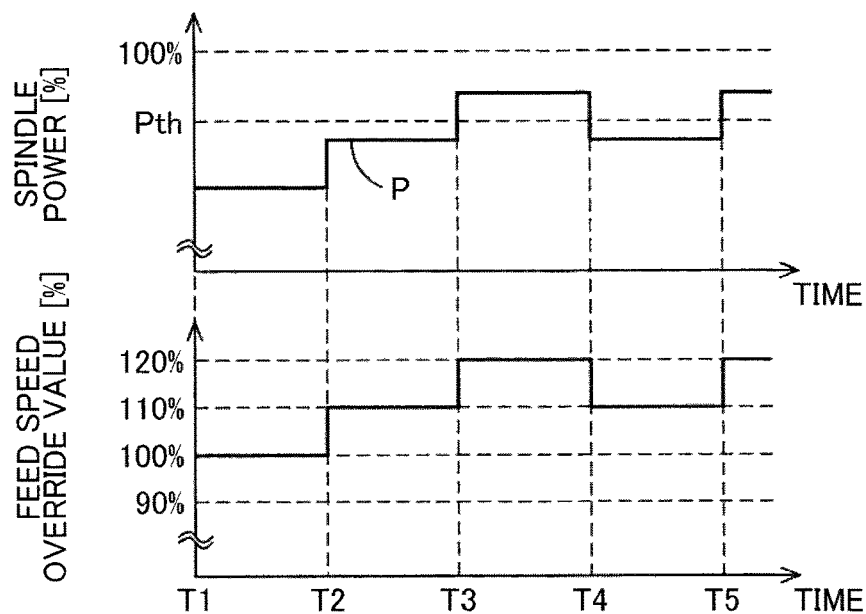
FIG. 5 shows behaviors of spindle power and an override value in the case where the workpiece material is JIS FC30 (casting iron)

As shown in FIG. 5, in the case where the workpiece material is FC30, the override value of the feed speed is 100% and the spindle power P is smaller than the prescribed spindle power Pth at time T1. The override value is therefore increased by 10% at time T2. As shown in FIG. 2, 10% is the override value variation ΔRv corresponding to the tool number and workpiece material in the information stored in the storage unit 11. The spindle power P is larger than the prescribed spindle power Pth at time T3. The override value is therefore decreased by 10% from 120% at time T4. The spindle power P thus behaves to fluctuate around and reach the prescribed spindle power Pth. During adaptive control, the prescribed spindle power Pth is therefore a target value of the spindle power P.

Figure 6:
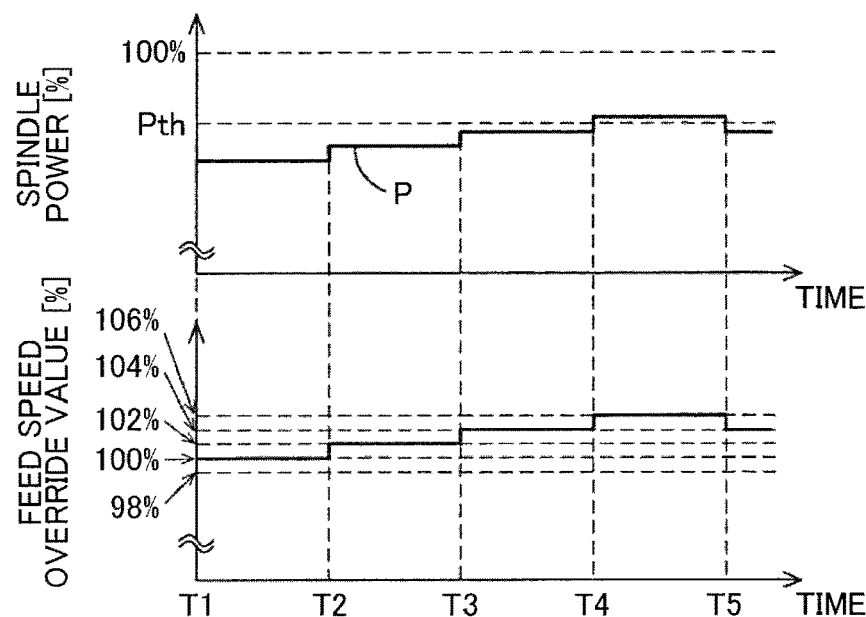
FIG. 6 shows behaviors of the spindle power and the override value in the case where the workpiece material is a titanium (Ti) alloy.

As shown in FIG. 6, in the case where the workpiece material is a Ti alloy, the override value of the feed speed is 100% and the spindle power P is smaller than the prescribed spindle power Pth at time T1. The override value is therefore increased by 2% at time T2. As shown in FIG. 2, 2% is the override value variation ΔRv corresponding to the tool number and workpiece material in the information stored in the storage unit 11. The spindle power P is larger than the prescribed spindle power Pth at time T4. The override value is therefore decreased by 2% from 106% at time T5. The spindle power P thus behaves to fluctuate around and reach the prescribed spindle power Pth.

As described above, the override value is set based on the override value variation ΔRv according to the workpiece material. This extends the tool life for various workpiece materials. Particularly in the case of machining a material with high hardness, an abrupt change in override value significantly affects (shortens) the tool life. In the case of machining a material with low hardness, an abrupt change in override value affects the tool life less than in the case of machining a material with high hardness. Setting the override value variation ΔRv according to the workpiece material as described above therefore ensures extension of the tool life.

Moreover, the override value is changed at the predetermined time intervals. Accordingly, the override value is not changed for the predetermined time once changed. For example, if the spindle power P during machining is sufficiently lower than the prescribed spindle power Pth, the override value is increased by the override value variation ΔRv, and is then further increased by the override value variation ΔRv after the predetermined time. Since the override value is thus changed at the predetermined time intervals, the rate of change in override value with time can be reliably changed by changing the override value variation ΔRv.

Figure 7:
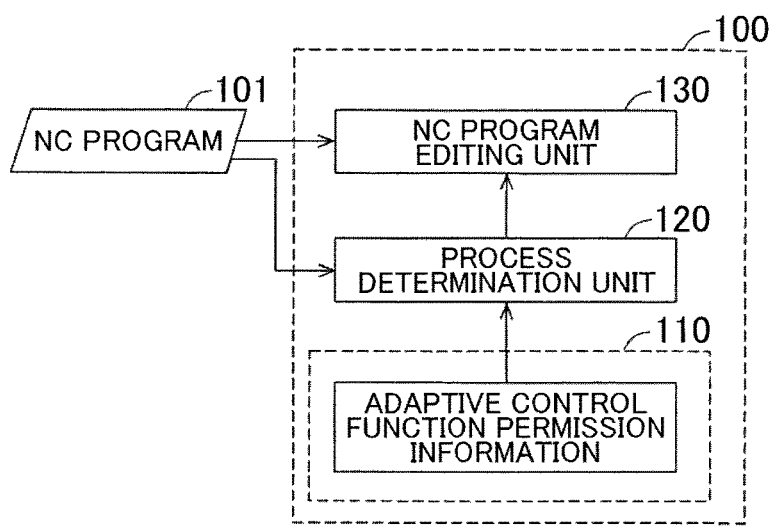
FIG. 7 is a block diagram of the NC program creating unit according to the second embodiment.

An NC program creating unit 100 according to a second embodiment of the invention will be described with reference to FIGS. 7 to 10. As shown in FIG. 7, the NC program creating unit 100 includes a storage unit 110, a process determination unit 120, and an NC program editing unit 130.

Figure 8:
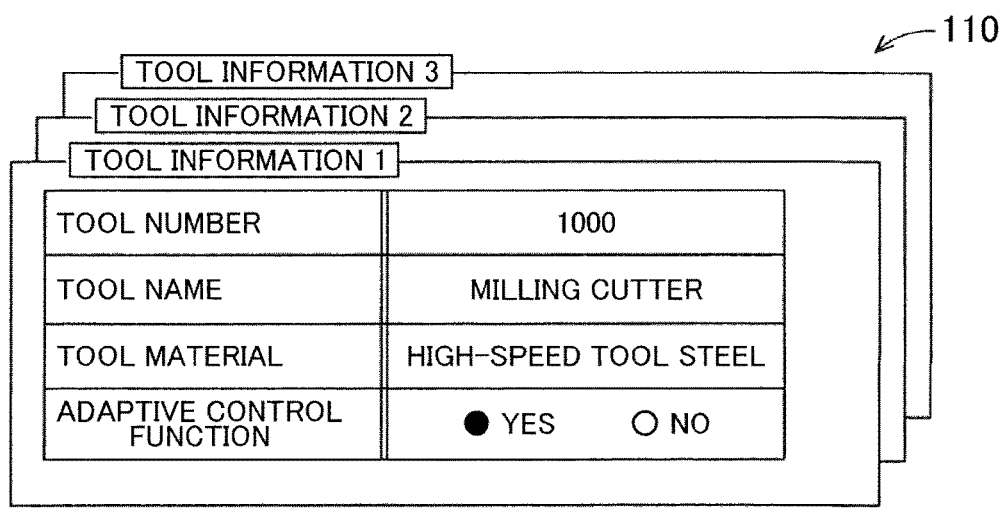
FIG. 8 shows tool information that is stored in a storage unit in FIG. 7.

As shown in FIG. 7, the storage unit 110 stores adaptive control function permission information for each of a plurality of tools included in a machine tool. Those tools for which adaptive control is used are determined in advance. As shown in FIG. 8, the information on each tool includes information on whether the use of the adaptive control function is permitted or not (shown by "YES" and "NO" in FIG. 8), in addition to a tool number, a tool name, and a tool material.

In tool information 1, for example, the tool number is "1000," the tool name is "milling cutter," and the tool material is "high-speed tool steel." Moreover, in the tool information 1, the information on whether the use of the adaptive control function is permitted or not is "YES."

For example, a tool that is used for rough machining is a tool for which adaptive control is used, and a tool that is used for finish machining is a tool for which adaptive control is not used. Machining efficiency is more important than machining accuracy in the rough machining, whereas machining accuracy is more important than machining efficiency in the finish machining. The use of adaptive control for machining can cause reduction in machining accuracy as the feed speed is changed in the adaptive control. Adaptive control is therefore not used for the finish machining. In the tool information, "YES" for the adaptive control function means that "changing of the override value of the feed speed is permitted," and "NO" for the adaptive control function means that "changing of the override value of the feed speed is not permitted."

The process determination unit 120 determines for each machining process in an existing NC program 101 if the machining process is a process using a tool for which the use of the adaptive control function is permitted. In the NC program 101, each tool to be used is classified into a rough machining process or a finish machining process. The rough machining process means a machining process using a tool for rough machining, and the finish machining process means a machining process using a tool for finish machining. Machining processes include a semi-finish machining process etc. in addition the rough machining process and the finish machining process.

The NC program editing unit 130 automatically inserts an adaptive control start code M55 at the start of the machining process and automatically inserts an adaptive control end code M56 at the end of the machining process if it is determined by the process determination unit 120 that the machining process is a process using a tool for which the use of the adaptive control function is permitted. The adaptive control start code M55 is a code that allows the override value to be changed, and the adaptive control end code M56 is a code that no longer allows the override value to be changed.

Figure 9:
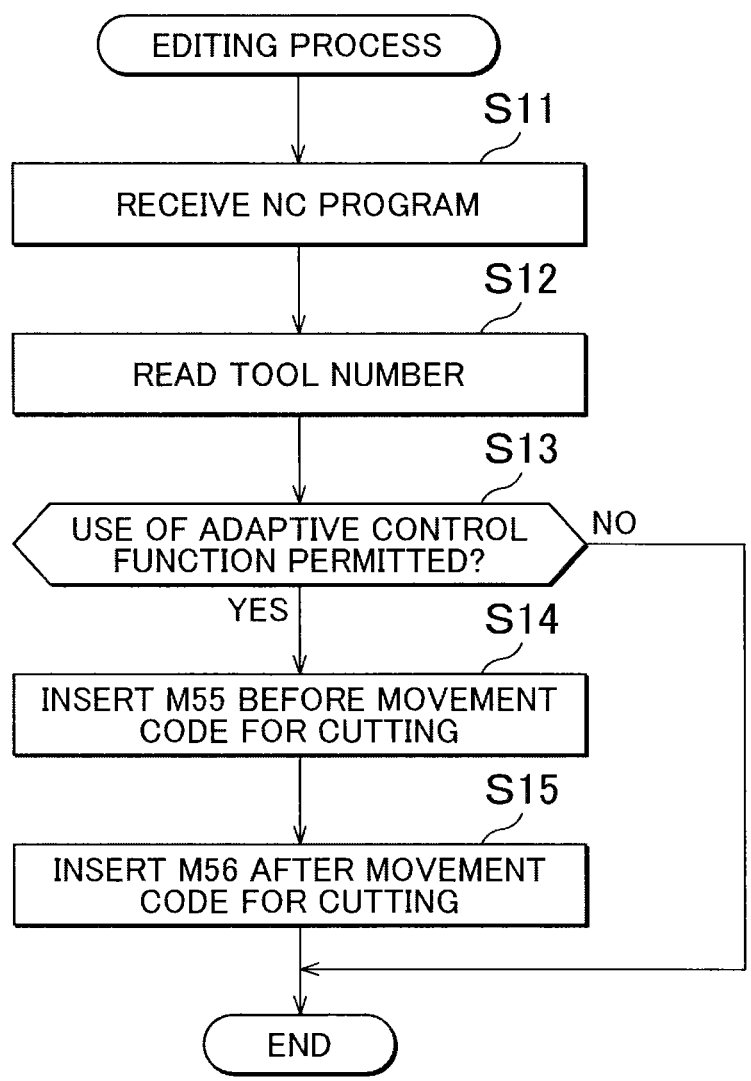
FIG. 9 is a flowchart illustrating a process that is performed by an NC program editing unit in FIG. 7.
Figure 10:
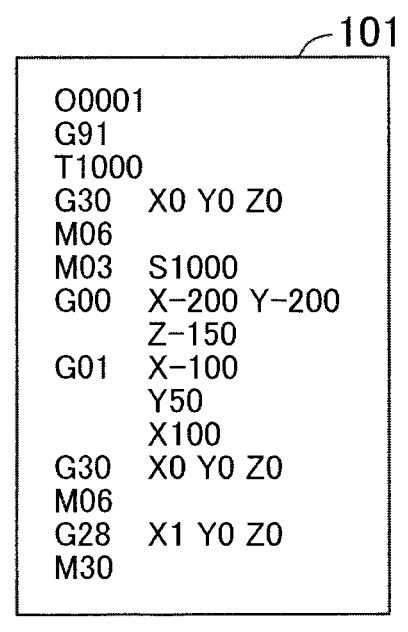

A process that is performed by the NC program editing unit 130 will be described with reference to FIG. 9. The NC program 101 created in advance is input to the NC program editing unit 130 (S11). This NC program 101 is as shown in FIG. 10. The NC program 101 shown in FIG. 10 is a program for a rough machining process using a milling cutter whose tool number is 1000, as shown by an instruction "T1000" on the third line of the NC program 101.

Thereafter, the NC program editing unit 130 reads a tool number in the NC program 101 (S12). The process determination unit 120 determines if the machining process is a process using a tool for which the use of the adaptive control function is permitted (S13). For example, if the tool number is 1000, the use of the adaptive control function is permitted for this tool, as shown in FIG. 8.

Subsequently, if it is determined that the use of the adaptive control function is permitted (S13: Yes), the NC program editing unit 130 inserts M55 before a movement code G01 for cutting (S14) (see A in FIG. 3) and inserts M56 after the movement code G01 for cutting (S15) (see B in FIG. 3), and terminates the process. If it is determined that the use of the adaptive control function is not permitted (S13: No), the NC program editing unit 130 terminates the process.

The NC program creating unit 100 creates the NC program 20 shown in FIG. 3 by the above process when it receives the NC program 101 shown in FIG. 10. As described in the first embodiment, machining is performed while the override value of the feed speed is changed according to the created NC program 20. As described above, the adaptive control start code M55 and the adaptive control end code M56 are automatically inserted in the NC program for the machining process in which the override value can be changed.

A numerical control unit 200 according to a third embodiment will be described with reference to FIGS. 11 and 12. The numerical control unit 200 of the third embodiment corresponds to the numerical control unit 10 of the first embodiment additionally having the function of the NC program creating unit of the second embodiment.

The numerical control unit 200 includes a storage unit 210, a process determination unit 120, an NC program editing unit 130, a spindle power detection unit 12, and an adaptive control unit 13. In the numerical control unit 200, the same configurations as those of the first and second embodiments are denoted with the same reference characters, and detailed description thereof will be omitted.

Figure 11:
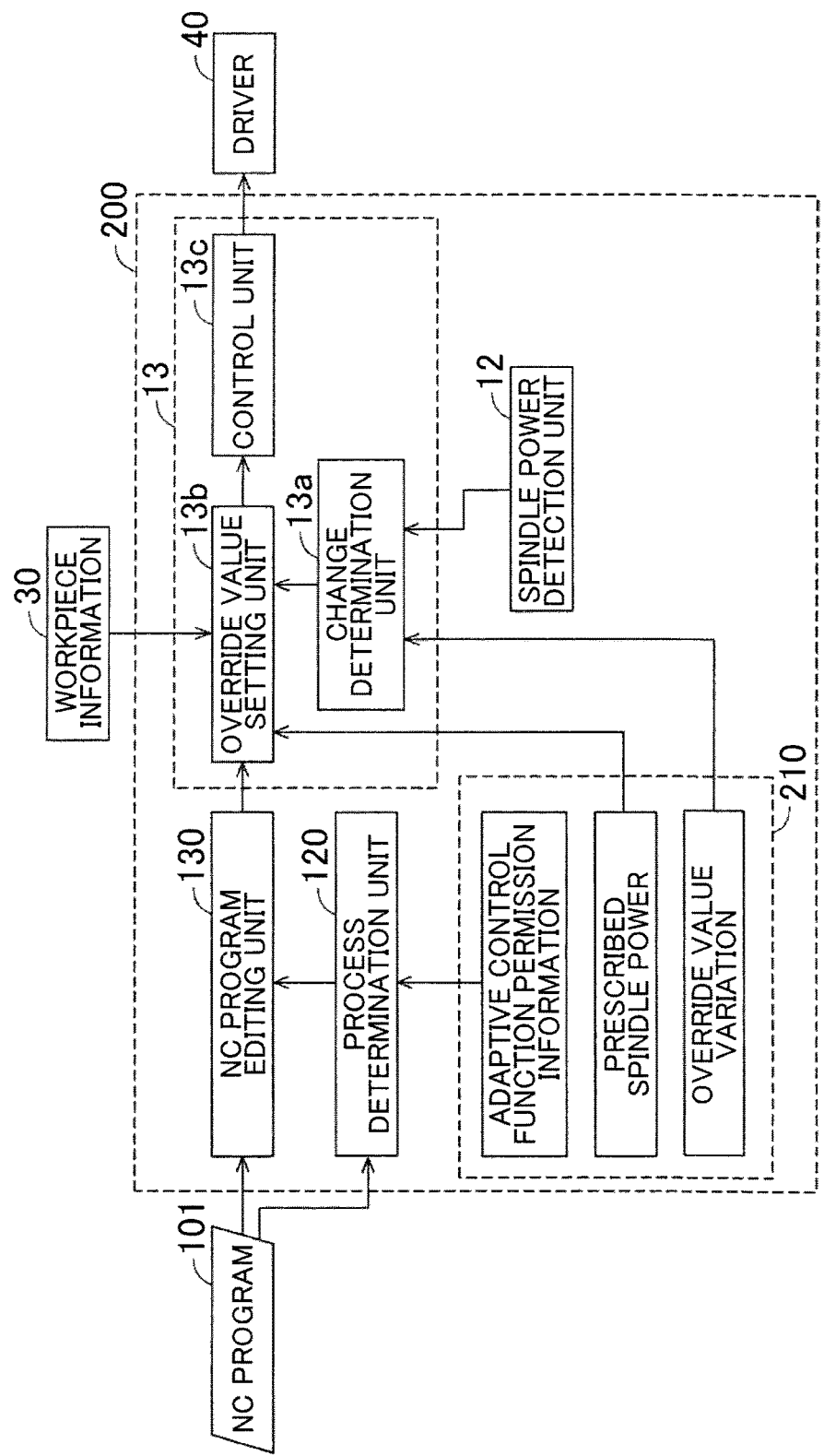
FIG. 11 is a block diagram of a numerical control unit according to the third embodiment.
Figure 12:
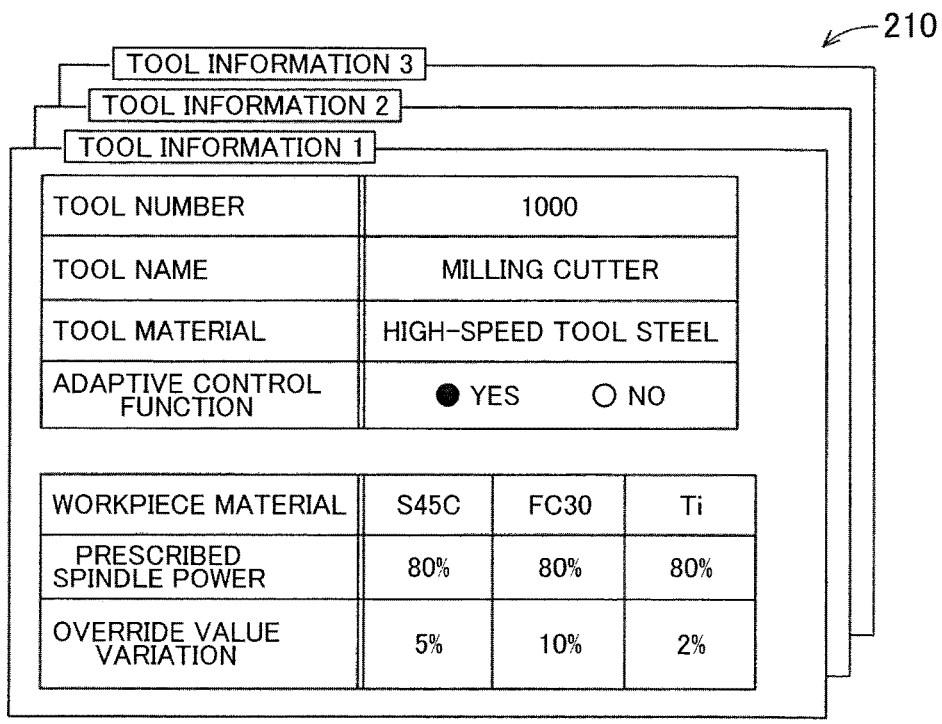
FIG. 12 shows tool information that is stored in a storage unit in FIG. 11.

As shown in FIG. 11, the storage unit 210 stores tool information for each of a plurality of tools included in a machine tool. As shown in FIG. 12, the tool information on each tool includes information on whether the use of an adaptive control function is permitted or not (shown by "YES" and "NO" in FIG. 12) and values of the prescribed spindle power Pth and the override value variation ΔRv according to workpiece materials, in addition to a tool number, a tool name, and a tool material.

That is, the process determination unit 120 and the NC program editing unit 130 of the numerical control unit 200 creates an NC program 20 in which an adaptive control start code M55 and an adaptive control end code M56 are automatically inserted in a machining process in which the override value can be changed. Moreover, the adaptive control unit 13 of the numerical control unit 200 performs adaptive control according to the material of the workpiece based on the created NC program 20.

The adaptive control of changing the override value of the feed speed is performed in the above embodiments. In other embodiments, however, adaptive control of changing the override value of the spindle speed instead of the override value of the feed speed may be performed by using a numerical control unit that allows the override value of the spindle speed to be changed.

The start code that allows the override value to be changed and the end code that no longer allows the override value to be changed are automatically inserted in the above embodiments. In other embodiments, however, it can be selected by interactive programming to automatically insert the start and end codes for the adaptive control that allows the override value to be changed. Entering data by the operator via the menu and items displayed on the screen (see FIGS. 2, 8, and 12) eliminates the need for the operator to enter the start and end codes via a keyboard to edit the program, thereby making it easier to create an NC program. That is, a desired NC program is created in view of the operator's intention.

What is claimed is:

1. A numerical control unit for a machine tool, comprising:
    circuitry configured to
    store a variation that is an amount of change to be used to change an override value, the variation being set for each workpiece material and the override value being a value that changes a command value of a feed speed or a spindle speed in an NC control program, the NC program including an end code that prevents further change to the override value;
    set the override value based on the variation according to a material of a workpiece being machined;
    change the feed speed or the spindle speed based on the override value;
    repeatedly compare spindle power consumption during machining with prescribed spindle power serving as a preset target value at predetermined time intervals to determine if the override value should be changed,
    change the override value by the variation each time it is determined that the override value should be changed until the end code is detected;
    store information on whether changing of the override value is permitted or not for each tool;
    determine for each machining process in an existing NC program if the machining process is a process using a tool for which changing of the override value is permitted;
    automatically insert a start code at a start of the machining process and automatically insert the end code at an end of the machining process if it is determined that the machining process is the process using the tool for which changing of the override value is permitted, the start code being a code that allows the override value to be changed; and
    start changing the override value based on the start code.

2. The numerical control unit according to claim 1, wherein the variation is set to a smaller value as a hardness of the workpiece material is higher and is set to a larger value as the hardness of the workpiece material is lower.

3. An NC program creating unit that creates an NC program for a machine tool, comprising:
    circuitry configured to:
    store a variation that is an amount of change to be used to change an override value, the variation being set for each workpiece material and the override value being a value that changes a command value of a feed speed or a spindle speed in an NC control program;
    store information on whether changing of the override value is permitted or not for each tool;

determine for each machining process in an existing NC program if the machining process is a process using a tool for which changing of the override value is permitted based upon the stored information on whether changing of the override value is permitted or not for each tool; and automatically insert a start code in the existing NC program at a start of the machining process and automatically insert an end code in the existing NC program at an end of the machining process if it is determined that the machining process is the process using the tool for which changing of the override value is permitted, the start code being a code that allows the override value to be changed and the end code being a code that no longer allows the override value to be changed.

4. The NC program creating unit according to claim 3, wherein the circuitry is configured to insert the start code and the end code if it is selected by interactive programming to insert the start code and the end code.

* * * * *